United States Patent
Chae et al.

(10) Patent No.: US 9,353,253 B2
(45) Date of Patent: May 31, 2016

(54) LOW GLOSS THERMOPLASTIC RESIN COMPOSITION HAVING IMPROVED SCRATCH RESISTANCE

(71) Applicant: Samsung SDI Co., Ltd., Yongin-si (KR)

(72) Inventors: Gyeong Ha Chae, Uiwang-si (KR); Min Young Lim, Uiwang-si (KR); Young Chul Kwon, Uiwang-si (KR); Kang Yeol Park, Uiwang-si (KR); Bo Eun Kim, Uiwang-si (KR); Joo Hyun Jang, Uiwang-si (KR); Jae Won Heo, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/566,802

(22) Filed: Dec. 11, 2014

(65) Prior Publication Data

US 2015/0183974 A1 Jul. 2, 2015

(30) Foreign Application Priority Data

Dec. 31, 2013 (KR) ........................ 10-2013-0168735

(51) Int. Cl.
*C08L 25/12* (2006.01)
*C08L 33/12* (2006.01)
*C08L 33/04* (2006.01)
*C08L 43/04* (2006.01)
*C08L 51/04* (2006.01)
*C08L 51/08* (2006.01)
*C08L 55/02* (2006.01)
*C08L 33/06* (2006.01)

(52) U.S. Cl.
CPC ................ *C08L 25/12* (2013.01); *C08L 33/04* (2013.01); *C08L 33/06* (2013.01); *C08L 33/12* (2013.01); *C08L 43/04* (2013.01); *C08L 51/04* (2013.01); *C08L 51/085* (2013.01); *C08L 55/02* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 8,198,367 B2 | 6/2012 | You et al. | |
| 2011/0160377 A1* | 6/2011 | Chung et al. | 524/504 |
| 2014/0187717 A1* | 7/2014 | Kwon et al. | 525/67 |
| 2015/0119489 A1 | 4/2015 | Kim | |
| 2015/0152205 A1* | 6/2015 | Kim et al. | 525/71 |

FOREIGN PATENT DOCUMENTS

| | | |
|---|---|---|
| EP | 2157129 A1 | 2/2010 |
| EP | 2865714 A1 | 4/2015 |
| KR | 10-2009-0029539 A | 3/2009 |
| WO | 2013/132722 A1 | 9/2013 |

OTHER PUBLICATIONS

Extended European Search Report in counterpart European Application No. 14200004.1 dated May 26, 2015, pp. 1-2.

* cited by examiner

*Primary Examiner* — Jeffrey Mullis
(74) *Attorney, Agent, or Firm* — Additon, Higgins & Pendleton, P.A.

(57) ABSTRACT

A low gloss thermoplastic resin composition can have improved scratch resistance, and includes a silicon compound-grafted aromatic vinyl-vinyl cyanide-based copolymer to improve mechanical physical properties such as scratch resistance, and the like, and to implement low gloss property. The low gloss composition can be used in a vehicle interior material.

12 Claims, No Drawings

LOW GLOSS THERMOPLASTIC RESIN COMPOSITION HAVING IMPROVED SCRATCH RESISTANCE

CROSS-REFERENCE TO RELATED APPLICATIONS

This application claims priority under 35 U.S.C. §119 to Korean Patent Application No. 10-2013-0168735, filed on Dec. 31, 2013, in the Korean Intellectual Property Office, the disclosure of which is incorporated herein by reference in its entirety.

FIELD OF THE INVENTION

The following disclosure relates to a thermoplastic resin composition, and more specifically, to a styrene-based resin composition which is appropriate for a vehicle interior material.

BACKGROUND

In general, an acrylonitrile-butadiene-styrene (ABS) resin has been widely used in various applications such as vehicles, electrical and electronic devices, office equipment, home appliances, toys, and the like, due to impact resistance of butadiene, workability, moldability and colorability of styrene, and physical properties such as rigidity, chemical resistance, and the like, and aesthetic appearance property of acrylonitrile. Most ABS resins have a high surface gloss or an intermediate surface gloss.

However, there has been a recent increase in demand for low gloss and/or mat finish resins for aesthetic and anti-glare purposes. In addition, with increased environmental concerns, there is trend away from the use of painting methods or covering a pad to provide a mat finish. Thus, there is an increased demand for resins that inherently have a mat finish.

One method to provide a low gloss resin adds or modifies a specific rubber-like component. However, the low gloss effect may not be significant, and impact strength and heat resistance can deteriorate.

Another method graft polymerizes a monomer such as an ethylene-unsaturated carboxylic acid with an ABS polymer. With this method, various physical properties of the resin can be excellent, but heat resistance can rapidly deteriorate.

Korean Patent Laid-Open Publication No. 2009-0029539 discloses a styrene-based resin composition containing a syndiotactic polystyrene resin as a matting agent. The matting agent has a syndiotactic structure, that is, a three-dimensional structure in which a phenyl group or a substituted phenyl group which is a side chain is positioned in an opposite direction with respect to a main chain formed by a carbon-carbon bond. Thus, unlike the existing amorphous polystyrene, the composition uses a polymer having crystallinity, such that desired low gloss property may be implemented. There are, however, still problems in that fluidity may be deteriorated, which can result in decreased workability, and appearance may be remarkably defective.

SUMMARY

An embodiment of the present invention is directed to providing a thermoplastic resin composition that can have improved scratch resistance, and low gloss and mat properties. Another embodiment of the present invention is directed to providing a thermoplastic resin composition capable of implementing mat and low glass property and having improved mechanical physical properties such as scratch resistance, impact strength, and the like, by including a silicon compound-grafted aromatic vinyl-vinyl cyanide-based copolymer.

In addition, another embodiment of the present invention is directed to providing a molded article that can have improved scratch resistance, mar scratch, and mechanical physical property, and low gloss and mat properties implemented from the thermoplastic resin composition.

In exemplary embodiments, a low gloss thermoplastic resin composition having improved scratch resistance includes: a rubber-modified vinyl-based graft copolymer (A); an acrylic resin (B); and a silicon-containing aromatic vinyl-vinyl cyanide-based copolymer (C).

The low gloss thermoplastic resin composition may further include an aromatic vinyl-vinyl cyanide-based copolymer (D).

The low gloss thermoplastic resin composition may include the rubber-modified vinyl-based graft copolymer (A) in an amount of about 10 to about 40 wt %; the acrylic resin (B) in an amount of about 30 to about 50 wt %; the silicon-containing aromatic vinyl-vinyl cyanide-based copolymer (C) in an amount of about 5 to about 30 wt %, and the aromatic vinyl-vinyl cyanide-based copolymer (D) in an amount of about 20 to about 50 wt %.

The silicon-containing aromatic vinyl-vinyl cyanide-based copolymer (C) may be prepared by copolymerization of a mixture including an aromatic vinyl-based compound, a vinyl cyanide-based compound, and an unsaturated group-containing silicon-based compound.

The silicon-containing aromatic vinyl-vinyl cyanide-based copolymer (C) may include the unsaturated group-containing silicon-based compound in an amount of about 0.1 to about 5 wt %.

The silicon-containing aromatic vinyl-vinyl cyanide-based copolymer (C) may have a weight average molecular weight of about 130,000 to about 180,000 g/mol, and a melt index measured at about 220 with about 10 kg of about 4 to 8 g/10 min.

The rubber-modified vinyl-based graft copolymer (A) may be an acrylonitrile-butadiene-styrene graft copolymer (g-ABS) obtained by graft polymerization of about 30 to about 70 wt % of a mixture including an aromatic vinyl-based compound and a vinyl cyanide-based compound with about 30 to about 70 wt % of a rubber-like polymer, using emulsion polymerization.

The acrylic resin (B) may have a weight average molecular weight of about 50,000 to about 300,000 g/mol, and may be a polymer including at least one (meth)acrylate-based monomer selected from the group consisting of methyl acrylate, ethyl acrylate, butyl acrylate, 2-ethylbutyl acrylate, 2-ethylhexyl(meth)acrylate, hexyl acrylate, heptyl acrylate, octyl acrylate, n-pentyl acrylate, vinyl acrylate, lauryl acrylate, methyl methacrylate, ethyl methacrylate, butyl methacrylate, 2-ethylbutyl methacrylate, 2-ethylhexyl methacrylate, lauryl methacrylate, and mixtures thereof.

The aromatic vinyl-vinyl cyanide-based copolymer (D) may include a styrene and acrylonitrile copolymer, an α-methyl styrene and acrylonitrile copolymer, and/or a styrene, α-methyl styrene and acrylonitrile copolymer.

The low gloss thermoplastic resin composition may further include an additive selected from the group consisting of antibacterial agents, heat stabilizers, antioxidants, release agents, light stabilizers, inorganic additives, surfactants, coupling agents, plasticizers, compatibilizers, lubricants, antistatic agents, colorants such as pigments and/or dyes, flame retardants, flame retardant aids, anti-dripping agents, weather resistant agents, ultraviolet radiation absorbers, ultraviolet radiation blockers, and mixtures thereof.

In exemplary embodiments, there is provided a molded article manufactured from the low gloss thermoplastic resin composition as described above.

The molded article may satisfy the following Equations 1 to 3:

$$H \leq hardness \leq 7H \quad \text{[Equation 1]}$$

$$13 \leq IZOD \leq 30 \quad \text{[Equation 2]}$$

$$50 \leq Gloss \leq 90 \quad \text{[Equation 3]}$$

wherein in Equation 1 above, hardness is a pencil hardness according to JIS K5401 standard, in Equation 2 above, IZOD is an IZOD impact strength (kgf·cm/cm) according to ASTM D256 standard, and in Equation 3 above, Gloss is a gloss according to ASTM D523 standard.

DETAILED DESCRIPTION OF EMBODIMENTS

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Hereinafter, unless technical and scientific terms used herein are defined otherwise, they have meanings understood by those skilled in the art to which the present invention pertains. Description of known functions and constitutions which obscure the description and the accompanying drawings of the present invention with unnecessary detail will be omitted.

Unless otherwise defined in the present specification, "(meth)acrylate" may include "acrylate" and "methacrylate".

As a result of research for developing a thermoplastic resin composition capable of implementing scratch resistance, low gloss and mat property, the present inventors found that a thermoplastic resin composition including a rubber-modified vinyl-based graft copolymer, an acrylic resin, a silicon-containing aromatic vinyl-vinyl cyanide-based copolymer, and optionally an aromatic vinyl-vinyl cyanide-based copolymer to improve scratch resistance, mar scratch and impact strength, and at the same time, low gloss and mat properties may be implemented by adjusting the amount of the silicon-containing aromatic vinyl-vinyl cyanide-based copolymer, thereby completing the present invention.

A low gloss thermoplastic resin composition that can have improved scratch resistance may include a rubber-modified vinyl-based graft copolymer (A), an acrylic resin (B), a silicon-containing aromatic vinyl-vinyl cyanide-based copolymer (C), and an aromatic vinyl-vinyl cyanide-based copolymer (D).

Hereinafter, each component is described in more detail.

(A) Rubber-Modified Vinyl-Based Graft Copolymer

The rubber-modified vinyl-based graft copolymer according to an exemplary embodiment of the present invention may improve impact strength, scratch resistance, and appearance property, by combination with other components in the composition.

The rubber-modified vinyl-based graft copolymer of the present invention may be a copolymer having a core-shell structure in which a core is a rubber-like polymer and a shell is an aromatic vinyl-based compound and a vinyl cyanide-based compound. The copolymer may be prepared by graft polymerization of the rubber-like polymer with a mixture including the aromatic vinyl-based compound and the vinyl cyanide-based compound. The polymerization method is not limited and can include methods known in the art, for example, may include a bulk polymerization, a suspension polymerization and/or an emulsion polymerization.

As an example thereof, the rubber-modified vinyl-based graft copolymer may be prepared by graft polymerization of about 30 to about 70 wt % of the mixture including the aromatic vinyl-based compound and the vinyl cyanide-based compound in the presence of about 30 to about 70 wt % of the rubber-like polymer, using emulsion polymerization.

Here, the rubber-like polymer may have an average particle size of about 0.1 to about 1.0 μm, for example an average particle size of about 0.2 to about 0.6 μm. Within this range, impact resistance and compatibility may be improved.

When the average particle size is less than about 0.1 μm, mechanical physical properties may be slightly increased but low-temperature impact strength may be remarkably decreased, and when the average particle size is more than about 1.0 μm, desired impact strength may not be achieved.

Examples of the rubber-like polymer include without limitation polybutadiene rubbers, acrylic rubbers, ethylene/propylene rubbers, styrene/butadiene rubbers, acrylonitrile/butadiene rubbers, polyisoprene rubbers, ethylene-propylene-diene terpolymers (EPDM), polyorganosiloxane/polyalkyl (meth)acrylate rubber composites, and the like, and mixtures of two or more selected therefrom. In exemplary embodiments, polybutadiene rubber may be used.

Examples of the aromatic vinyl-based compound include without limitation styrene, $C_1$-$C_{10}$ alkyl-substituted styrene, halogen-substituted styrene, vinyl toluene, vinyl naphthalene, and the like, and mixtures thereof. Examples of the alkyl-substituted styrene may include without limitation α-methyl styrene, p-methyl styrene, o-ethyl styrene, m-ethyl styrene, p-ethyl styrene, p-t-butyl styrene, 2,4-dimethyl styrene, and the like, and mixtures thereof. In exemplary embodiments, styrene may be used as the aromatic vinyl-based compound.

Examples of the vinyl cyanide-based compound include without limitation acrylonitrile, methacrylonitrile, ethacrylonitrile, phenyl acrylonitrile, fumaronitrile and the like, and mixtures thereof. In exemplary embodiments, acrylonitrile may be used.

The thermoplastic resin composition may include the rubber-modified vinyl-based graft copolymer in an amount of about 10 to about 40 wt %, for example about 15 to about 30 wt %, based on the total weight (100 wt %) of the thermoplastic resin composition. In some embodiments, the thermoplastic resin composition may include the rubber-modified vinyl-based graft copolymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the rubber-modified vinyl-based graft copolymer can be in a range from about any of the foregoing amounts to about any other of the foregoing amounts.

When the amount of the rubber-modified vinyl-based graft copolymer is less than about 10 wt %, compatibility of the thermoplastic resin may be decreased to deteriorate impact strength, and when the amount thereof is more than about 40 wt %, fluidity may be decreased to deteriorate molding workability.

(B) Acrylic Resin

The acrylic resin according to an exemplary embodiment of the present invention may have a partial compatibility with the aromatic vinyl-vinyl cyanide-based copolymer to effectively improve chemical resistance and impact strength in the resin.

The acrylic resin of the present invention may have a weight average molecular weight of about 50,000 to about 300,000 g/mol, for example a weight average molecular weight of about 70,000 to about 180,000 g/mol. In the above-described range, compatibility with the aromatic vinyl-vinyl cyanide-based copolymer may be excellent to improve impact strength and chemical resistance. In addition, fluidity of the resin may be increased and molding workability may be excellent.

Since the acrylic resin in the present invention is melted at a low temperature at the time of an injection molding due to a high fluidity, the acrylic resin is positioned in a kneading zone in preference to other components to serve as a coating role. Accordingly, stress of various components including pigment contained in the composition may be previously prevented. At the time of manufacturing various components of light display devices which become gradually miniaturized and thin, excellent surface property may be provided.

The acrylic resin may have a glass transition temperature of about 70 to about 110. In the above-described range, fluidity of the resin and compatibility with other components may be increased, and stress at the time of working may be decreased, such that moldability and surface property may be improved.

The acrylic resin in the present invention may be a polymer including about 60 to about 99 wt % of one or more (meth) acrylate-based monomer(s) including (C1-C14)alkyl groups. In some embodiments, the acrylic resin may include the (meth)acrylate-based monomer including (C1-C14)alkyl groups in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the (meth)acrylate-based monomer including (C1-C14)alkyl groups can be in a range from about any of the foregoing amounts to about any other of the foregoing amounts.

When the amount of the (meth)acrylate-based monomer satisfies the above-described range, impact resistance and molding workability properties may be improved. When the amount thereof is less than about 60 wt %, the acrylic resin may be decomposed at a high temperature, and when the amount thereof is more than about 99 wt %, fluidity and impact resistance may be deteriorated.

The acrylic resin may be a polymer including any one or two or more of (meth)acrylate-based monomers. Examples of the (meth)acrylate-based monomers may include without limitation methyl acrylate, ethyl acrylate, butyl acrylate, 2-ethylbutyl acrylate, 2-ethylhexyl(meth)acrylate, hexyl acrylate, heptyl acrylate, octyl acrylate, n-pentyl acrylate, vinyl acrylate, lauryl acrylate, methyl methacrylate, ethyl methacrylate, butyl methacrylate, 2-ethylbutyl methacrylate, 2-ethylhexyl methacrylate, lauryl methacrylate, and the like, and mixtures thereof.

The acrylic resin in the present invention may be prepared by general methods such as a bulk polymerization, an emulsion polymerization, or a suspension polymerization of the above-suggested monomers with a solvent and a polymerization initiator, but the present invention is not limited these methods. Examples of the solvent may include without limitation methanol, tetrahydrofuran, ethers such as ethyleneglycol monomethylether, ethyleneglycol monoethylether, propyleneglycol monomethylether acetate, methyl cellosolve acetate, ethyl cellosolve acetate, diethyleneglycol monomethylether, diethyleneglycol monoethyl ether, and the like, and mixtures thereof. Examples of the polymerization initiator may include without limitation 2,2'-azobisisobutyronitrile, 2,2'-azobis(2,4-dimethylvaleronitrile), 2,2'-azobis(4-methoxy-2,4-dimethyl valeronitrile), and the like, and mixtures thereof.

The thermoplastic resin composition may include the acrylic resin in an amount of about 30 to about 50 wt %, based on the total weight (100 wt %) of the thermoplastic resin composition. In some embodiments, the thermoplastic resin composition may include the acrylic resin in an amount of about 30, 31, 32, 33, 34, 35, 36, 37, 38, 39, 40, 41, 42, 43, 44, 45, 46, 47, 48, 49, or 50 wt %. Further, according to some embodiments of the present invention, the amount of the acrylic resin can be in a range from about any of the foregoing amounts to about any other of the foregoing amounts.

When the acrylic resin is present in an amount within the above-described range, harmony of fluidity, impact strength, and scratch resistance may be excellent. When the amount thereof is less than about 30 wt %, a synergistic effect according to the combination with other components can be difficult to achieve, and impact strength and scratch resistance may be deteriorated. When the amount thereof is more than about 50 wt %, fluidity may be deteriorated to decrease molding workability.

(C) Silicon-Containing Aromatic Vinyl-Vinyl Cyanide-Based Copolymer

The silicon-containing aromatic vinyl-vinyl cyanide-based copolymer according to an exemplary embodiment of the present invention may improve scratch resistance and low gloss property by combination with other components in the composition.

The silicon-containing aromatic vinyl-vinyl cyanide-based copolymer of the present invention may be a copolymer of a monomer mixture including an aromatic vinyl-based compound (C1), a vinyl cyanide-based compound (C2) and an unsaturated group-containing silicon-based compound (C3).

Examples of the aromatic vinyl-based compound (C1) may include without limitation styrene, $C_1$-$C_{10}$ alkyl-substituted styrene, halogen-substituted styrene, vinyl toluene, vinyl naphthalene, and the like, and mixtures thereof.

Examples of the alkyl-substituted styrene may include without limitation α-methyl styrene, p-methyl styrene, o-ethyl styrene, m-ethyl styrene, p-ethyl styrene, p-t-butyl styrene, 2,4-dimethyl styrene, and the like, and mixtures thereof.

In exemplary embodiments, styrene, α-methyl styrene, or a mixture thereof may be used.

The silicon-containing aromatic vinyl-vinyl cyanide-based copolymer may include the aromatic vinyl-based compound in an amount of about 60 to about 79 wt %, based on the total weight (100 wt %) of the silicon-containing aromatic vinyl-vinyl cyanide-based copolymer. In some embodiments, the silicon-containing aromatic vinyl-vinyl cyanide-based copolymer may include the aromatic vinyl-based compound in an amount of about 60, 61, 62, 63, 64, 65, 66, 67, 68, 69, 70, 71, 72, 73, 74, 75, 76, 77, 78, or 79 wt %. Further, according to some embodiments of the present invention, the amount of the aromatic vinyl-based compound can be in a range from about any of the foregoing amounts to about any other of the foregoing amounts.

In the above-described range, impact strength and heat resistance of the low glass thermoplastic resin composition may be improved.

Examples of the vinyl cyanide-based compound (C2) can include without limitation acrylonitrile, methacrylonitrile, ethacrylonitrile, phenyl acrylonitrile, α-chloroacrylonitrile, fumaronitrile and the like, and mixtures thereof. In exemplary embodiments, acrylonitrile may be used.

The silicon-containing aromatic vinyl-vinyl cyanide-based copolymer may include the vinyl cyanide-based compound in an amount of about 20 to about 39 wt %, based on the total weight (100 wt %) of the silicon-containing aromatic vinyl-vinyl cyanide-based copolymer. In some embodiments, the silicon-containing aromatic vinyl-vinyl cyanide-based copolymer may include the vinyl cyanide-based compound in an amount of about 20, 21, 22, 23, 24, 25, 26, 27, 28, 29, 30, 31, 32, 33, 34, 35, 36, 37, 38, or 39 wt %. Further, according to some embodiments of the present invention, the amount of the vinyl cyanide-based compound can be in a range from about any of the foregoing amounts to about any other of the foregoing amounts.

A weight mixing ratio (aromatic vinyl-based compound: vinyl cyanide-based compound) of the aromatic vinyl-based compound and the vinyl-cyanide-based compound may be about 7:3 to about 9:1. When the amount of the vinyl cyanide-based compound satisfies the above-described range, scratch resistance may be improved with minimal or no deterioration of mechanical physical property and molding workability of the low gloss thermoplastic resin composition, by the combination with other components.

The unsaturated group-containing silicon-based compound (C3) may be used to implement excellent low gloss property while maintaining various physical properties such as impact resistance, heat resistance, and the like.

The unsaturated group-containing silicon-based compound may contain two or more unsaturated groups, and may include a compound represented by the following Chemical Formula 1, singly or as a mixture thereof:

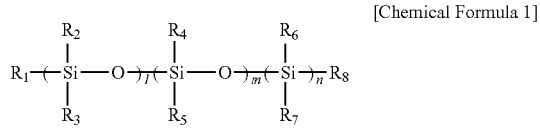

[Chemical Formula 1]

wherein in Chemical Formula (1), l, m and n are the same or different and are each independently an integer of 0 to 100 (provided that l, m and n are not all zero at the same time), and $R_1$ to $R_8$ are the same or different and are each independently hydrogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_3$-$C_{30}$ cycloalkyl group, a substituted or unsubstituted $C_6$-$C_{30}$ aryl group, a substituted or unsubstituted $C_1$-$C_{30}$ heteroaryl group, a hydroxyl group, an alkoxy group, an amino group, an epoxy group, a carboxyl group, a halogen group, an ester group, an isocyanate group, or a mercapto group, wherein at least two of $R_1$ to $R_8$ may include a polymerizable unsaturated group and the compound may have a linear or cyclic structure.

In the silicon-containing aromatic vinyl-vinyl cyanide-based copolymer according to an exemplary embodiment of the present invention, the unsaturated group-containing silicon-based compound may be represented by the following Chemical Formula 2:

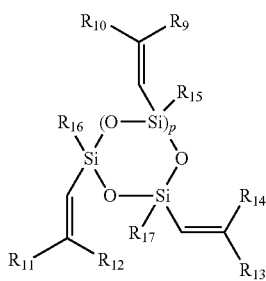

[Chemical Formula 2]

wherein in Chemical Formula (2), $R_9$ to $R_{14}$ are the same or different and are each independently a substituted or unsubstituted $C_1$-$C_{20}$ alkyl group, a substituted or unsubstituted $C_2$-$C_{20}$ alkenyl group or a substituted or unsubstituted $C_6$-$C_{20}$ aryl group, $R_{15}$ to $R_{17}$ are the same or different and are each independently hydrogen or a substituted or unsubstituted $C_1$-$C_6$ alkyl group, and p is an integer of 1 to 6.

Examples of the two or more unsaturated groups-containing silicon-based compound may include without limitation 1,3,5-triisopropyl-1,3,5-trivinyl-cyclotrisiloxane, 1,3,5,7-tetraisopropyl-1,3,5,7-tetravinyl-cyclotetrasiloxane, 1,3,5,7,9-pentaisopropyl-1,3,5,7,9-pentavinyl-cyclopentasiloxane, 1,3,5-tri sec-butyl-1,3,5-trivinyl-cyclotrisiloxane, 1,3,5,7-tetra sec-butyl-1,3,5,7-tetravinyl-cyclotetrasiloxane, 1,3,5,7,9-penta sec-butyl-1,3,5,7,9-pentavinyl-cyclopentasiloxane, 1,3,5-triisopropyl-1,3,5-trimethyl-cyclotrisiloxane, 1,3,5,7-tetraisopropyl-1,3,5,7-tetramethyl-cyclotetrasiloxane, 1,3,5,7,9-pentaisopropyl-1,3,5,7,9-pentamethyl-cyclopentasiloxane, 1,3,5-triisopropyl-1,3,5-triethyl-cyclotrisiloxane, 1,3,5,7-tetraisopropyl-1,3,5,7-tetraethyl-cyclotetrasiloxane, 1,3,5,7,9-pentaisopropyl-1,3,5,7,9-pentaethyl-cyclopentasiloxane, 1,1,3,3,5,5-hexaisopropyl-cyclotrisiloxane, 1,1,3,3,5,5,7,7-octaisopropyl-cyclotetrasiloxane, 1,1,3,3,5,5,7,7,9,9-decaisopropyl-cyclopentasiloxane, 1,3,5-tri sec-butyl-1,3,5-trimethyl-cyclotrisiloxane, 1,3,5,7-tetra sec-butyl-1,3,5,7-tetramethyl-cyclotetrasiloxane, 1,3,5,7,9-penta sec-butyl-1,3,5,7,9-pentamethyl-cyclopentasiloxane, 1,3,5-tri sec-butyl-1,3,5-triethyl-cyclotrisiloxane, 1,3,5,7-tetra-sec-butyl-1,3,5,7-tetraethyl-cyclotetrasiloxane, 1,3,5,7,9-penta sec-butyl-1,3,5,7,9-pentaethyl-cyclopentasiloxane, 1,3,5-triisopropyl-cyclotrisiloxane, 1,3,5,7-tetraisopropyl-cyclotetrasiloxane, 1,3,5,7,9-pentaisopropyl-cyclopentasiloxane, 1,3,5-tri sec-butyl-cyclotrisiloxane, 1,3,5,7-tetra sec-butyl-cyclotetrasiloxane, 1,3,5,7,9-penta sec-butyl-cyclopentasiloxane, 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and the like, and mixtures thereof.

In exemplary embodiments, 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, or a mixture thereof may be used. For example, 1,3,5,7-tetramethyl-1,3,5,7-tetravinyl-cyclotetrasiloxane may be used.

The unsaturated group-containing silicon-based compound in the present invention may implement low gloss property which is difficult to achieve using existing cross-linking agents, and also various excellent physical properties such as impact resistance, heat resistance, and the like, alone or in combination with other components. Also, as compared to existing cross-linking agents, it can be easy to adjust the degree of cross-linking and polymerization reaction rate using the unsaturated group-containing silicon-based compound in the present invention.

The unsaturated group-containing silicon-based compound may have a weight average molecular weight of about 150 to about 6,000 g/mol. When the above-described range is satisfied, the degree of cross-linking may be easy to be adjusted and the cross-linking reaction may be smoothly performed, thereby implementing excellent low gloss property.

The silicon-containing aromatic vinyl-vinyl cyanide-based copolymer may include the unsaturated group-containing silicon-based compound in an amount of about 0.1 to about 5 wt %, based on the total weight (100 wt %) of the silicon-containing aromatic vinyl-vinyl cyanide-based copolymer. In some embodiments, the silicon-containing aromatic vinyl-vinyl cyanide-based copolymer may include the unsaturated group-containing silicon-based compound in an amount of about 0.1, 0.2, 0.3, 0.4, 0.5, 0.6, 0.7, 0.8, 0.9, 1, 2, 3, 4, or 5 wt %. Further, according to some embodiments of the present invention, the amount of the unsaturated group-containing silicon-based compound can be in a range from about any of the foregoing amounts to about any other of the foregoing amounts.

In the above-described range, scratch resistance and low gloss property may be improved.

The silicon-containing aromatic vinyl-vinyl cyanide-based copolymer in the present invention may be prepared by general polymerization methods such as a suspension polymerization, an emulsion polymerization, a solution polymerization, and the like, using the above-described monomer mixture, but the present invention is not necessarily limited thereto. As an example of a method of preparing the copolymer, a suspension polymerization may be used.

The silicon-containing aromatic vinyl-vinyl cyanide-based copolymer according to an exemplary embodiment of the present invention may have a weight average molecular weight of about 130,000 to about 180,000 g/mol. In the above-described range, scratch resistance and low gloss property may be maintained with an appropriate balance.

In addition, the silicon-containing aromatic vinyl-vinyl cyanide-based copolymer of the present invention may have a melt index measured at about 220 with about 10 kg of about 4 to about 8 g/10 min. In the above-described range, impact strength and scratch resistance may be improved, and low gloss property may be effectively implemented.

The thermoplastic resin composition may include the silicon-containing aromatic vinyl-vinyl cyanide-based copolymer in an amount of about 5 to about 30 wt %, based on the total weight (100 wt %) of the low gloss thermoplastic resin composition. In some embodiments, the thermoplastic resin composition may include the silicon-containing aromatic vinyl-vinyl cyanide-based copolymer in an amount of about 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the silicon-containing aromatic vinyl-vinyl cyanide-based copolymer can be in a range from about any of the foregoing amounts to about any other of the foregoing amounts.

When the silicon-containing aromatic vinyl-vinyl cyanide-based copolymer is present in an amount within the above-described range, the composition can exhibit an excellent balance of fluidity, impact strength, low gloss property, and scratch resistance.

(D) Aromatic Vinyl-Vinyl Cyanide-Based Copolymer

The aromatic vinyl-vinyl cyanide-based copolymer according to an exemplary embodiment of the present invention, which is to improve impact strength and molding workability by combination with other components in the composition, may be a copolymer of an aromatic vinyl-based compound and a vinyl cyanide-based compound.

The aromatic vinyl-vinyl cyanide-based copolymer may include the aromatic vinyl-based compound and the vinyl cyanide-based compound in a weight ratio of about 70:30 to about 90:10, for example, a weight ratio may be about 75:25 to about 85:15. In the above-described range, impact strength and fluidity may be improved.

Examples of the aromatic vinyl-based compound may include without limitation styrene, $C_1$-$C_{10}$ alkyl-substituted styrene, halogen-substituted styrene, vinyl toluene, vinyl naphthalene, and the like, and mixtures thereof.

Examples of the alkyl-substituted styrene may include without limitation α-methyl styrene, p-methyl styrene, o-ethyl styrene, m-ethyl styrene, p-ethyl styrene, p-t-butyl styrene, 2,4-dimethyl styrene, and the like, and mixtures thereof.

Examples of the vinyl cyanide-based compound may include without limitation acrylonitrile, methacrylonitrile, ethacrylonitrile, phenyl acrylonitrile, fumaronitrile, and the like, and mixtures thereof.

Examples of the aromatic vinyl-vinyl cyanide-based copolymer may include without limitation a styrene and acrylonitrile copolymer; an α-methyl styrene and acrylonitrile copolymer; and/or a styrene, α-methyl styrene and acrylonitrile copolymer. In exemplary embodiments, the styrene-acrylonitrile copolymer may be used.

In addition, the aromatic vinyl-vinyl cyanide-based copolymer of the present invention may further selectively include an ethylenically unsaturated monomer. Accordingly, physical properties such as workability, heat resistance, and the like, may be improved.

Examples of the ethylenically unsaturated monomer may include without limitation aromatic esters of acrylic acids and/or methacrylic acids such as methyl methacrylate, ($C_1$-$C_4$)alkyl methacrylate, phenyl acrylate, phenyl methacrylate, benzyl acrylate, benzyl methacrylate, 2-phenylethyl acrylate, 2-phenylethyl methacrylate, 2-phenoxyethyl acrylate, 2-phenoxyethyl methacrylate, and the like, N-substituted maleimides such as N-methyl-, N-phenyl- and N-cyclohexylmaleimide, and the like, maleic acid, fumaric acid, itaconic acid and anhydrides thereof, acrylic acid, methacrylic acid, dicarboxylic acids, nitrogen-functional monomers such as dimethylamino ethyl acrylate, diethylaminoethyl acrylate, vinylimidazole, vinylpyrrolidone, vinyl caprolactam, vinyl carbazole, vinyl aniline, acrylamide, methacrylamide, and the like, and mixtures thereof.

The aromatic vinyl-vinyl cyanide-based copolymer according to an exemplary embodiment of the present invention may have a weight average molecular weight of about 100,000 to about 180,000 g/mol, for example, a weight average molecular weight of about 120,000 to about 160,000 g/mol. In the above-described range, impact strength and workability may be maintained with an appropriate balance.

The thermoplastic resin composition may include the aromatic vinyl-vinyl cyanide-based copolymer in an amount of about 20 to about 50 wt %, based on the total weight (100 wt %) of the thermoplastic resin composition. In some embodiments, the thermoplastic resin composition may include the aromatic vinyl-vinyl cyanide-based copolymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the aromatic vinyl-vinyl cyanide-based copolymer can be in a range from about any of the foregoing amounts to about any other of the foregoing amounts.

When the aromatic vinyl-vinyl cyanide-based copolymer is present in an amount within the above-described range, harmony of fluidity, impact strength, and scratch resistance may be excellent. When the amount of the aromatic vinyl-vinyl cyanide-based copolymer is less than about 20 wt %, impact strength and scratch resistance may be decreased and when the amount of the aromatic vinyl-vinyl cyanide-based copolymer is more than about 50 wt %, fluidity may be deteriorated to decrease molding workability.

The thermoplastic resin composition of the present invention may further include one or more general additives depending on a desired usage, in addition to the above-described components. Examples of the additives may include without limitation antibacterial agents, heat stabilizers, antioxidants, release agents, light stabilizers, inorganic additives, surfactants, coupling agents, plasticizers, compatibilizers, lubricants, anti-static agents, colorants such as pigments and/or dyes, flame retardants, flame retardant aids, anti-dripping agents, weather resistant agents, ultraviolet radiation absorbers, ultraviolet radiation blockers, and the like and mixtures thereof.

The low gloss thermoplastic resin composition of the present invention may be prepared by methods known in the art. For example, each component and optional additive(s) can be mixed by Henschel mixer, V blender, a tumbler blender, a ribbon blender, and the like, followed by melt-extrusion by a single-screw extruder or a twin-screw extruder at a temperature of about 150 to about 300° C., thereby preparing a pellet form. For example, the pellet form may be prepared by extrusion under conditions of a temperature of about 180 to about 280° C., a screw rotation rate of about 300 to about 600 rpm, and a self-supply rate of about 60 to about 600 kg/hr, using a twin-screw extruder of L/D=20~60, Φ=32 mm and 70 mm.

According to another exemplary embodiment of the present invention, there is provided a molded article manufactured by molding the above-described thermoplastic resin composition. The molded articles may be manufactured by various processes such as an injection molding, a double injection molding, a blow molding, an extrusion molding, a heat molding, and the like, by using the thermoplastic resin composition.

The molded article of the present invention may satisfy the following Equations 1 to 3:

$H \leq \text{hardness} \leq 7H$ [Equation 1]

$13 \leq IZOD \leq 30$ [Equation 2]

$50 \leq Gloss \leq 90$ [Equation 3]

wherein in Equation 1 above, hardness is a pencil hardness according to JIS K5401 standard, in Equation 2 above, IZOD is an IZOD impact strength (kgf·cm/cm) according to ASTM D256 standard, and in Equation 3 above, Gloss is a gloss according to ASTM D523 standard.

The molded article of the present invention may have excellent impact resistance, scratch resistance, and mar scratch, and may effectively implement low gloss property, thereby being effectively used as a vehicle interior material requiring these properties.

Hereinafter, the following Examples will be provided in order to describe the present invention in more detail. However, the present invention is not limited to these Examples.

Measurement of Physical Properties

1) Izod Impact Strength (Unit: kgf·cm/cm)

The izod impact strength is measured under a notched condition of ⅛"thickness, according to ASTM D-256 standard.

2) Surface Gloss (Unit: G.U.)

The surface gloss is measured at an angle of about 60° on a sample having a thickness of about 2.5 mm, by a surface gloss meter (UGV-6P manufactured by Suga Test Instruments Co., Ltd.), according to ASTM D-523 standard.

3) Pencil Hardness

Pencil hardness is measured by applying 500 g of load onto a surface of a sample having a thickness of 3 mm, a length of about 10 mm and a width of about 10 mm five times and determining a degree of scratch with the naked eye, according to JIS K5401 standard, wherein when scratch mark by pencil occurs twice or more times, the scratch mark is determined by a pencil hardness level from 4B to 7H.

4) Mar Scratch

Whether or not scratch occurs is confirmed by attaching a microfiber cloth to the axis and using a single-screw wear resistance tester on the surface of the sample, under conditions of a round-trip of about 5 cm and a rate of 60 times per min, with 20 times repeat. The degree of the scratch occurred on the surface of the sample is evaluated by relative comparison and the ranking thereof was determined in a descending order of the scratches.

5) Ball Type Scratch Profile (Unit: μm)

The surface of the sample is scratched under conditions of a load of 1000 g and a rate of about 75 mm/min by a spherical metal tip having a diameter of about 0.7 mm, and a depth of the scratch in the scratch range is measured by a contact typed surface profile analyzer having a metal stylus tip with a diameter of about 2 μm, manufactured by Ambios Company.

Specifications of each component used in the following Examples and Comparative Examples are as follows.

(A) Rubber-Modified Vinyl-Based Graft Copolymer

A g-ABS resin having a core-shell structure prepared by emulsion graft polymerization of about 58 wt % of a butadiene rubber having an average particle size of about 0.26 μm with styrene and acrylonitrile is used.

(B) Acrylic Resin

Polymethylmethacrylate (PMMA, Product Name: PM-7200, manufactured by Cheil Industries Inc.) having a weight average molecular weight of about 105,000 g/mol is used.

(C) Silicon-Containing Aromatic Vinyl-Vinyl Cyanide-Based Copolymer

A silicon-containing aromatic vinyl-vinyl cyanide-based copolymer having a weight average molecular weight of about 155,000 g/mol copolymerized from about 79 wt % of styrene, about 30 wt % of acrylonitrile and about 1 wt % of 1,3,5,7-tetramethyl-1,3,5,7-tetravinyl-cyclotetrasiloxane (manufactured by SKC Company, density: 0.98 g/ml (20° C.), Product Name: Vinyl D-4, Molecular Weight: 344.7 g/mol) is used.

(D) Aromatic Vinyl-Vinyl Cyanide-Based Copolymer

A styrene-acrylonitrile (SAN) copolymer having a weight average molecular weight of about 153,000 g/mol copolymerized from about 20 wt % of acrylonitrile and about 80 wt % of styrene is used.

Example 1

As described in the following Table 1, a low gloss thermoplastic resin composition is prepared by mixing about 15 wt % of a rubber-modified vinyl-based graft copolymer (A), about 35 wt % of an acrylic resin (B), about 5 wt % of a silicon-containing aromatic vinyl-vinyl cyanide-based copolymer (C) and about 45 wt % of an aromatic vinyl-vinyl cyanide-based copolymer (D) and mixed in a general mixer, then the obtained mixture is extruded by a twin-screw extruder with L/D=35, Φ=45 mm, thereby preparing a pellet. Before injection molding, the prepared pellet is dried in a dehumidifying drier apparatus at about 80° C. for 2 hours and then is prepared as a sample for measuring physical properties by 10 oz injection machine at an injection temperature of about 230° C. The measured physical properties are shown in the following Table 2.

Example 2

As described in the following Table 1, Example 2 is prepared by the same method as Example 1 above except for using a low gloss thermoplastic resin composition prepared by mixing about 15 wt % of a rubber-modified vinyl-based graft copolymer (A), about 35 wt % of an acrylic resin (B), about 10 wt % of a silicon-containing aromatic vinyl-vinyl cyanide-based copolymer (C) and about 40 wt % of an aromatic vinyl-vinyl cyanide-based copolymer (D), and physical properties thereof are measured and shown in the following Table 2.

Example 3

As described in the following Table 1, Example 3 is prepared by the same method as Example 1 above except for using a low gloss thermoplastic resin composition prepared by mixing about 15 wt % of a rubber-modified vinyl-based graft copolymer (A), about 35 wt % of an acrylic resin (B), about 15 wt % of a silicon-containing aromatic vinyl-vinyl cyanide-based copolymer (C) and about 35 wt % of an aromatic vinyl-vinyl cyanide-based copolymer (D), and physical properties thereof are measured and shown in the following Table 2.

Example 4

As described in the following Table 1, Example 4 is prepared by the same method as Example 1 above except for using a low gloss thermoplastic resin composition prepared by mixing about 15 wt % of a rubber-modified vinyl-based graft copolymer (A), about 35 wt % of an acrylic resin (B), about 20 wt % of a silicon-containing aromatic vinyl-vinyl cyanide-based copolymer (C) and about 30 wt % of an aromatic vinyl-vinyl cyanide-based copolymer (D), and physical properties thereof are measured and shown in the following Table 2.

Comparative Example 1

As described in the following Table 1, Comparative Example 1 is prepared by the same method as Example 1 above except for not using the silicon-containing aromatic vinyl-vinyl cyanide-based copolymer (C), but using a low gloss thermoplastic resin composition prepared by mixing about 15 wt % of a rubber-modified vinyl-based graft copolymer (A), about 35 wt % of an acrylic resin (B), and about 50 wt % of an aromatic vinyl-vinyl cyanide-based copolymer (D), and physical properties thereof are measured and shown in the following Table 2.

Comparative Example 2

As described in the following Table 1, Comparative Example 2 is prepared by the same method as Example 1 above except for using a low gloss thermoplastic resin composition prepared by mixing about 15 wt % of a rubber-modified vinyl-based graft copolymer (A), about 35 wt % of an acrylic resin (B), about 3 wt % of a silicon-containing aromatic vinyl-vinyl cyanide-based copolymer (C) and about 47 wt % of an aromatic vinyl-vinyl cyanide-based copolymer (D), and physical properties thereof are measured and shown in the following Table 2.

TABLE 1

| | | (A) Rubber-Modified Vinyl-based Graft Copolymer | (B) Acrylic Resin | (C) Silicon-Containing Aromatic Vinyl-Vinyl Cyanide-based Copolymer | (D) Aromatic Vinyl-Vinyl Cyanide-based Copolymer |
|---|---|---|---|---|---|
| Example | 1 | 15 | 35 | 5 | 45 |
| | 2 | 15 | 35 | 10 | 40 |
| | 3 | 15 | 35 | 15 | 35 |
| | 4 | 15 | 35 | 20 | 30 |
| Comparative Example | 1 | 15 | 35 | — | 50 |
| | 2 | 15 | 35 | 3 | 47 |

TABLE 2

| | | Impact Strength (kgf·cm/cm) | Gloss (G·U) | Pencil Hardness | BSP (μm) | Mar scratch (Ranking) |
|---|---|---|---|---|---|---|
| Example | 1 | 13.8 | 87.5 | H | 258 | 7 |
| | 2 | 14.1 | 81.5 | H | 261 | 5 |
| | 3 | 14.8 | 76.0 | H | 260 | 2 |
| | 4 | 15.2 | 72.3 | H | 258 | 1 |
| Comparative Example | 1 | 10.0 | 93.5 | F | 268 | 10 |
| | 2 | 12.7 | 90.0 | H | 264 | 8 |

As demonstrated by Table 2 above, Examples 1 to 4 according to the present invention exhibit excellent impact strength, gloss and mar scratch properties as compared to Comparative Examples 1 to 2.

By including the silicon-containing aromatic vinyl-vinyl cyanide-based copolymer in an optimum amount, the thermoplastic resin composition may exhibit improved impact resistance and scratch resistance with minimal or no deterioration of fluidity. In addition, the crosslinked silicon present in the resin creates roughness on the surface of the sample to induce diffused reflection, thereby making it possible to implement desired low gloss property.

Meanwhile, since Comparative Example 1 did not include the silicon-containing aromatic vinyl-vinyl cyanide-based copolymer, impact resistance and low gloss property are remarkably decreased. In Comparative Example 2 when the silicon-containing aromatic vinyl-vinyl cyanide-based copolymer is in an amount outside of the optimum content range, impact strength and scratch resistance are deteriorated and gloss is increased, such that low gloss property is not sufficient.

Thus the low gloss thermoplastic resin composition according to an exemplary embodiment of the present invention may have excellent impact resistance and scratch resistance and may effectively implement low gloss property.

The thermoplastic resin composition according to the present invention may have excellent impact resistance, scratch resistance, and mar scratch, and may implement low gloss and mat properties.

The surface gloss may be adjusted by adjusting an amount of the silicon-containing aromatic vinyl-vinyl cyanide-based copolymer.

Therefore, the thermoplastic resin composition according to the present invention may be applied to a vehicle interior material, and the like, simultaneously requiring impact resistance, workability and low gloss and mat properties, to thereby provide excellent surface and physical properties.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A low gloss thermoplastic resin composition having improved scratch resistance comprising:
   a rubber-modified vinyl-based graft copolymer (A);
   a (meth)acrylic resin (B); and
   a silicon-containing aromatic vinyl-vinyl cyanide-based copolymer (C),
wherein a molded article formed of the composition satisfies the following Equations 1 to 3:

$$H \leq hardness \leq 7H \quad \text{[Equation 1]}$$

$$13 \leq IZOD \leq 30 \quad \text{[Equation 2]}$$

$$50 \leq Gloss \leq 90 \quad \text{[Equation 3]}$$

wherein in Equation 1 above, hardness is a pencil hardness according to JIS K5401 standard, in Equation 2 above, IZOD is an IZOD impact strength (kgf·cm/cm) according to ASTM D256 standard, and in Equation 3 above, Gloss is a gloss according to ASTM D523 standard.

2. The low gloss thermoplastic resin composition of claim 1, further comprising: an aromatic vinyl-vinyl cyanide-based copolymer (D).

3. The low gloss thermoplastic resin composition of claim 2, comprising the rubber-modified vinyl-based graft copolymer (A) in an amount of about 10 to about 40 wt %; the (meth)acrylic resin (B) in an amount of about 30 to about 50 wt %; the silicon-containing aromatic vinyl-vinyl cyanide-based copolymer (C) in an amount of about 5 to about 30 wt %, and the aromatic vinyl-vinyl cyanide-based copolymer (D) in an amount of about 20 to about 50 wt %, each based on the total weight (100 wt %) of the thermoplastic resin composition.

4. The low gloss thermoplastic resin composition of claim 1, wherein the silicon-containing aromatic vinyl-vinyl cyanide-based copolymer (C) includes an aromatic vinyl-based compound, a vinyl cyanide-based compound, and an unsaturated group-containing silicon-based compound.

5. The low gloss thermoplastic resin composition of claim 1, wherein the silicon-containing aromatic vinyl-vinyl cyanide-based copolymer (C) is prepared by copolymerization of a mixture including an aromatic vinyl-based compound, a vinyl cyanide-based compound, and an unsaturated group-containing silicon-based compound.

6. The low gloss thermoplastic resin composition of claim 4, wherein the silicon-containing aromatic vinyl-vinyl cyanide-based copolymer (C) includes the unsaturated group-containing silicon-based compound in an amount of about 0.1 to about 5 wt %.

7. The low gloss thermoplastic resin composition of claim 1, wherein the silicon-containing aromatic vinyl-vinyl cyanide-based copolymer (C) has a weight average molecular weight of about 130,000 to about 180,000 g/mol, and a melt index measured at 220° C. with 10 kg of about 4 to about 8 g/10 min.

8. The low gloss thermoplastic resin composition of claim 1, wherein the rubber-modified vinyl-based graft copolymer (A) is an acrylonitrile-butadiene-styrene graft copolymer (g-ABS) Obtained by graft polymerization of about 30 to about 70 wt % of a mixture including an aromatic vinyl-based compound and a vinyl cyanide-based compound with about 30 to about 70 wt % of a rubber-like polymer, using emulsion polymerization.

9. The low gloss thermoplastic resin composition of claim 1, wherein the (meth)acrylic resin (B) has a weight average molecular weight of about 50,000 to about 300,000 g/mol, and is a polymer including (meth)acrylate-based monomer selected from the group consisting of methyl acrylate, ethyl acrylate, butyl acrylate, 2-ethylbutyl acrylate, 2-ethylhexyl (meth)acrylate, hexyl acrylate, heptyl acrylate, octyl acrylate, n-pentyl acrylate, vinyl acrylate, lauryl acrylate, methyl methacrylate, ethyl methacrylate, butyl methacrylate, 2-ethylbutyl methacrylate, 2-ethyl hexyl methacrylate, lauryl methacrylate, and mixtures thereof.

10. The low gloss thermoplastic resin composition of claim 2, wherein the aromatic vinyl-vinyl cyanide-based copolymer (D) comprises a styrene and acrylonitrile copolymer, an α-methyl styrene and acrylonitrile copolymer, a styrene, α-methyl styrene and acrylonitrile copolymer, or a mixture thereof.

11. The low gloss thermoplastic resin composition of claim 1, further comprising an additive selected from the group consisting of antibacterial agents, heat stabilizers, antioxidants, release agents, light stabilizers, inorganic additives, surfactants, coupling agents, plasticizers, compatibilizers, lubricants, anti-static agents, colorants, flame retardants, flame retardant aids, anti-dripping agents, weather resistant agents, ultraviolet radiation absorbers, ultraviolet radiation blockers, and mixtures thereof.

12. A molded article manufactured from the low gloss thermoplastic resin composition of claim 1.

* * * * *